United States Patent [19]

Kawamura et al.

[11] 4,326,783
[45] Apr. 27, 1982

[54] INTERCHANGEABLE OBJECTIVE LENS SINGLE-LENS REFLEX CAMERA FOCUSING DEVICE

[75] Inventors: Kunio Kawamura, Sakai; Hiroshi Ueda, Nara, both of Japan

[73] Assignee: Minolta Camera Kabushiki Kaisha, Osaka, Japan

[21] Appl. No.: 247,189

[22] Filed: Mar. 24, 1981

[30] Foreign Application Priority Data

Mar. 26, 1980 [JP] Japan .................................. 55-39325

[51] Int. Cl.³ .......................... G03B 3/10; G03B 7/08
[52] U.S. Cl. ..................................... 354/25; 354/195; 354/198; 354/201; 354/286
[58] Field of Search ................. 354/25, 152, 187, 188, 354/195, 201, 286, 198

[56] References Cited

U.S. PATENT DOCUMENTS

| | | | |
|---|---|---|---|
| 3,668,992 | 6/1972 | Harvey | 354/187 |
| 3,691,922 | 9/1972 | Konig et al. | 354/25 |
| 3,798,660 | 3/1974 | Hasegawa et al. | 354/25 |
| 3,812,509 | 5/1974 | Westphalen | 354/195 |
| 4,095,246 | 6/1978 | Kellner | 354/187 |
| 4,146,320 | 3/1979 | Schrader | 354/187 |

Primary Examiner—John Gonzales
Attorney, Agent, or Firm—Wolder, Gross & Yavner

[57] ABSTRACT

A single lens reflex camera includes a vertical open topped U-shaped bracket mounted in the camera body below the pentaprism, a forwardly located lens mount separably coupled to an objective lens and pairs of links mutually pivoted between their ends connected between the bracket arms and corresponding edges of the lens mount to support the latter in a fixed orientation for linear longitudinal movement along the camera optical axis. A light tight collapsible conduit extends between the camera body and lens mounts and includes telescoping members with relatively slidable side and bottom walls and an accordian top wall. A rack carrying slide arm projects rearwardly from the lens mount and is engaged by a motor driven gear to longitudinally shift the lens mount. The motor is controlled manually or in response to a focus detecting device and the lens mount may be motor advanced and retracted or motor advanced and spring retracted. The lens diaphragm is automatically stopped down by a camera housed mechanism and diaphragm control information is transmitted from the lens mount to the camera body.

20 Claims, 8 Drawing Figures

INTERCHANGEABLE OBJECTIVE LENS SINGLE-LENS REFLEX CAMERA FOCUSING DEVICE

BACKGROUND OF THE INVENTION

1. Field of the Invention

The present invention relates generally to improvements in cameras and it relates particularly to an improved motor focussed, single-lens reflex camera of the interchangeable objective lens type.

In the conventional objective lens exchangeable single-lens reflex cameras, focussing of the objective lens is performed by rotating a focussing ring provided on the objective lens barrel. However, when an automatic focussing device is incorporated in the single-lens reflex camera and a drive device such as an electric motor controlled by the automatic focussing device is used to rotate the focussing ring for focussing an objective lens, it is almost impossible to control the focus of all types of objective lenses, since the distance between the focussing and the camera body varies with the type of objective lens, as does the force required for rotating the focussing ring. Even if, in such type of camera, it is possible to automatically control the focus of all types of objective lenses a complex interlocking mechanism must be provided, thereby posing the problem of an appreciable increase in the size and price of the camera. In an attempt to solve this problem, there has been proposed a device in which an entire objective lens is longitudinally moved along the camera optical axis for controlling focus (U.S. Pat. No. 3,798,660 granted Mar. 19, 1979). With such device, however, the lens mounting member of the camera to which the exchangeable objective lens is mounted, is supported by a ring rotated by a motor within the camera and the rotatable ring itself serves as a guide member therefor, or the lens mounting member is restricted to movement along the optical axis by a guide pin fixed to the camera body. As a result, the length of the available lens shift is greatly limited, posing a further problem. Increasing the length of the available lens shift in such a device requires that the length of a rotatable ring supporting the lens mounting member be increased along the optical axis or that the guide pin be lengthened. However, such increase in size results in a larger camera body, causing much inconvenience. Consequently, the devices heretofore proposed possess the drawback that the length of available lens shift cannot be increased without an increase in the camera size.

Furthermore, with the earlier structures, a lens mounting member on which an exchangeable objective lens is mounted is formed as a cylindrical member, part of which is positioned near the viewer penta prism. In addition, the lens mounting member and its support must be thick and sturdy enough to withstand the weight of an exchangeable objective lens which is coupled to the lens mounting member, thereby necessitating the provision of a large space near the penta prism. Therefore, the earlier structures have the lens mounting member and the supporting member therefore assembled near the camera viewer penta prism, the design freedom of which is greatly impeded in terms of the penta prism arrangement.

SUMMARY OF THE INVENTION

It is a principal object of the present invention to provide improved single lens reflex camera focussing mechanism.

Another object of the present invention is to provide an improved focussing mechanism in an interchangeable objective lens single-lens reflex camera with which focussing is effected by moving the entire objective lens along its optical axis.

Still another object of the present invention is to provide an improved focussing mechanism in which an increase in the length of the available lens shift along the optical axis is achieved without any increase in the size of the camera body.

A further object of the present invention is to provide a focussing mechanism which includes almost none of its component parts near the camera pentaprism thereby permitting freedom of design without interfering with the pentaprism arrangement.

Still a further object of the present invention is to provide a mechanism of the above nature characterized by its reliability, ruggedness, ease and efficiency of operation, minimum space consumption, low cost and great versatility and adaptability.

The above and other objects of the present invention will become apparent from a reading of the following description taken in conjunction with the accompanying drawings which illustrate a preferred embodiment thereof.

A single lens reflux camera in accordance with the present invention comprises a body member having a front aperture and a pentaprism, an apertured mounting member having coupling means for separably engaging an interchangeable objective lens, a pair of laterally spaced longitudinally extendable retractable support members extending between the body member and mounting member and supporting the mounting member for longitudinal movement only at a fixed orientation, an extendable collapsible light tight conduit extending between the mounting and body members in registering with the apertures therein and control motor means in said body member for longitudinally advancing and retracting the mounting member.

In accordance with a preferred form of the improved camera a laterally extending U-shaped bracket is affixed to the body member and includes a bottom cross arm and side arms in opposite sides of the body member front aperture and is open at its top and the mounting member comprises a plate with a bottom and vertical side flanges. Each of the support members comprises a pair of levers or links mutually pivoted intermediate their ends and each lever being pivotally connected at its ends to the bracket side and bottom arms and to a mounting plate flange respectively, one end of each lever being vertically slidably coupled to the bracket side arm or mounting plate flange. The control motor means includes a motor controlled in response to a manual switch or a focus detecting network and coupled to the mounting plate by a motion translator defining rack and gear arrangement.

The improved focussing mechanism permits a wide range of axial movement of the mounting plate coupled objective lens without interfering with the camera components, including the pentaprism, requires no increase in the size of the camera, is reliable, rugged and efficient and is of great versatility and adaptability.

DETAILED DESCRIPTION OF THE PREFERRED EMBODIMENTS

Referring now to the drawings, particularly FIGS. 1 to 7 thereof which illustrated a preferred embodiment of the present invention, the reference numeral 2 generally designates an objective lens which is equipped with a focussing ring 4, diaphragm setting ring 6, a transmission lug 6a extending rearwardly from diaphragm setting ring 6 for the transmission of a diaphragm aperture value preset by manually operating diaphragm setting ring 6, and a diaphragm preset pin 8.

Figure 1:
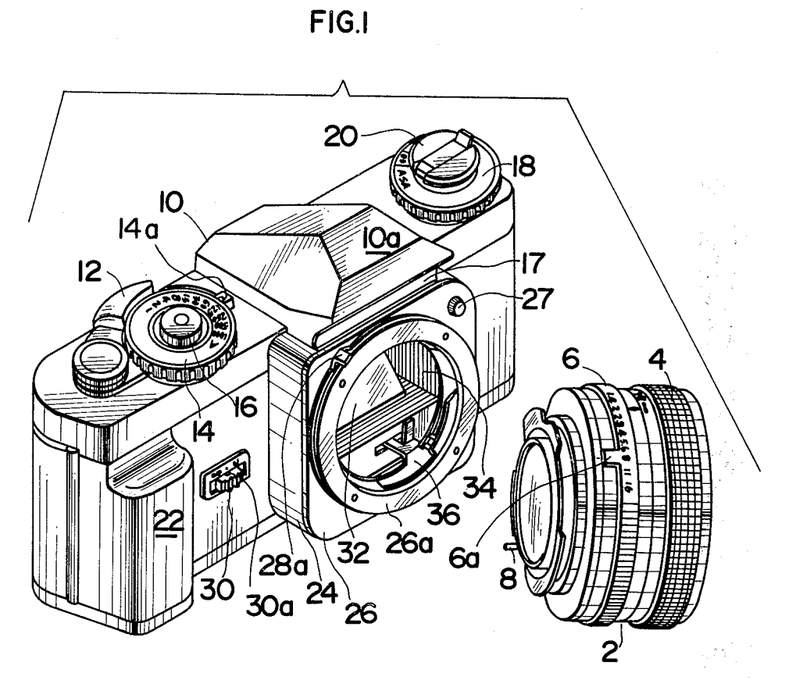
FIG. 1 is a perspective view of a camera embodying the present invention, and illustrated with the objective lens separated.
Figure 2:
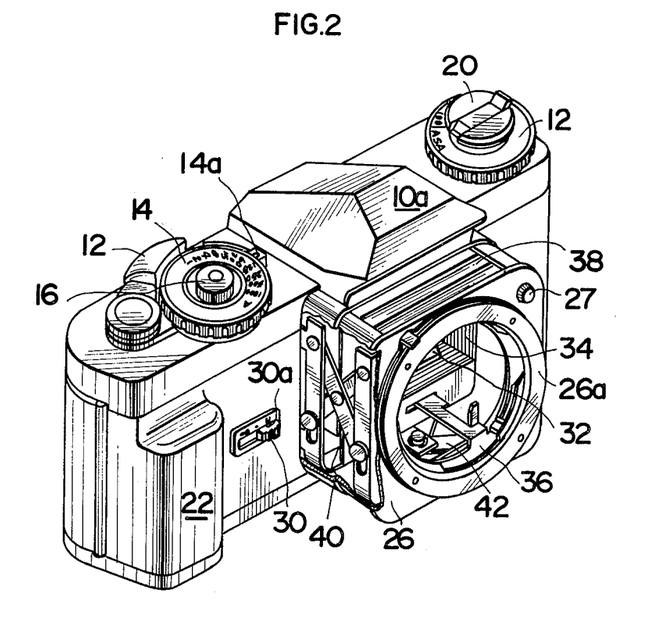
FIG. 2 is a partially fragmented, perspective view of the camera shown in FIG. 1, illustrated in a lens mount extended position.

A camera body 10, to which objective lens 2 is replaceably mounted, includes a pentaprism portion 10a, a film advancing lever 12, a shutter speed setting dial 14, a shutter release button 16, a film speed setting dial 18, a rewind knob 20 and a cell chamber 22 which also serves as a hand grip. Displayed on the top surface of shutter speed setting dial 14 is a scale of numerals corresponding to shutter speed and a mark "A" for automatic shutter speed control. With a numeral on the scale set to index 14a, a shutter mechanism (not shown) operates at a shutter speed corresponding to the set numeral. With mark "A" set to index 14a, photography in a diaphragm priority automatic shutter speed control mode is established. Moreover, provided beneath pentaprism portion 10a at the front of camera body 10, is a fixed housing 24, which is connected through a link assembly to a lens mount 26, on which objective lens 2 is interchangably mountable, as shown in FIG. 2. Lens mount 26 is box shaped and open at its rear and top and slidably telescopes into fixed housing 24 and includes rearwardly projecting bottom and side walls at the rear of lens mount 26 which extend along inside the bottom and sides of fixed housing 24, the inner surfaces thereof overlapping the outer surfaces of lens mount 26. The top surface of lens mount 26 is connected to fixed housing 24 by means of an accordion wall or collapsible bellows 38, so that lens mount 26 is joined to fixed housing 24 for external light shielding even when moved along the optical axis. Mounted on the front wall of lens mount 26 are flange ring or annulus 26a of lens mount 26, lens-lock release button 27 which unlocks an objective lens when it is to be removed, and transmission ring 28 with interlocking lug 28a which interlocks with transmission lug 26a when objective lens 2 is mounted on lens mount 26 to thereby transmit the diaphragm aperture value preset by the objective lens to mechanism in the camera body 10.

A changeover switch 30 is arranged on the front face of camera body 10 and is manually operable and connected and designed to energize a motor, as hereinafter described, for shifting lens mount 26 along the optical axis when index 30a on switch 30 is set to a mark "N" and for retracting lens mount 26 along the optical axis when index 30a is set to mark "  ". When index 30a is set to mark ".", the motor is stopped to cease the movement of lens mount 26. FIG. 1 shows the condition of lens mount 26 in its fully retracted position along the optical axis.

Disposed within the camera body 10 are a movable mirror 32, a mirror box 34 and a diaphragm preset ring 36. Diaphragm preset ring 36 is movable along the optical axis integrally with lens mount 26 so that it is maintained in engagement with diaphragm preset pin 8 of objective lens 2, when lens mount 26 is shifted to any position within its overall range of shifting along the optical axis. Diaphragm preset ring 36 is rotated clockwise in response to the shutter release operation to permit the rotation of preset pin 8 which is urged to follow diaphragm preset ring 36 and to stop down the diaphragm mechanism.

Figure 7:
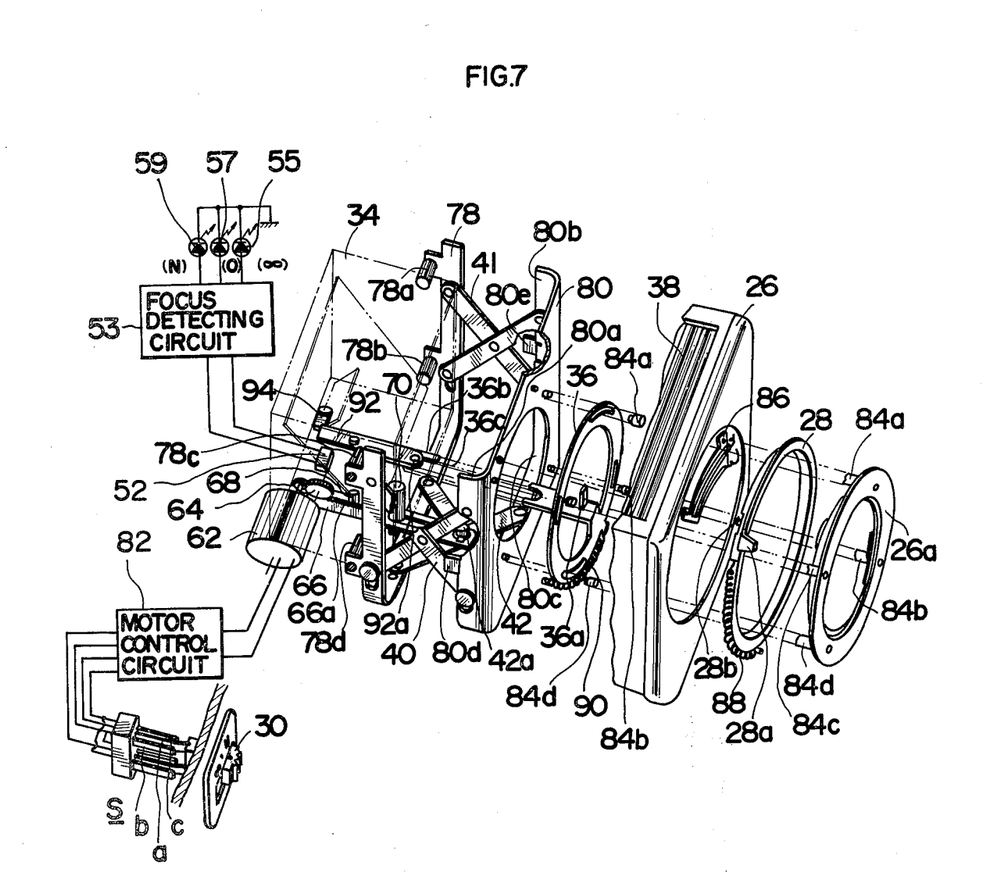
FIG. 7 is an exploded perspective and diagrammatic view of the essential parts of the embodiment of FIG. 1.

FIG. 2 shows the condition of lens mount 26 advanced along the optical axis from its fully retracted position as shown in FIG. 1. Referring to FIG. 2, the contractable bellows or accordian wall 38 connects fixed housing 24 and lens mount 26 for external light shielding, the bellows being provided only on the top side thereof. The bottom and sides of the bellows or contractable conduit are defined by the fixed housing 24 and lens mount 26 which overlap for external light shielding. Consequently, even when lens mount 26 is shifted along the optical axis, as described later, fixed housing 24 and lens mount 26 are always connected together to shield external light, a light tight expandable chamber being established between housing 24 and lens mount 26. X-shaped link assemblies 40, 41 and 42, as best seen in FIG. 7, are provided between fixed housing 24 and lens mount 26, and are longitudinally expandable or extendable along the optical axis, each link assembly moving in a plane parallel to the optical axis. These link assemblies are provided on the bottom and sides of fixed housing 24, not on the top side thereof, i.e., not near pentaprism portion 10a since this would restrict or limit the positioning of the pentaprism, due to the provision of a link assembly on the top side. It is to be noted that although link assemblies provided on the bottom and one side alone are sufficient, their provision along three quadrilateral surfaces, as in the present embodiment, increase the over rigidity and strength of the structure.

Figure 3:
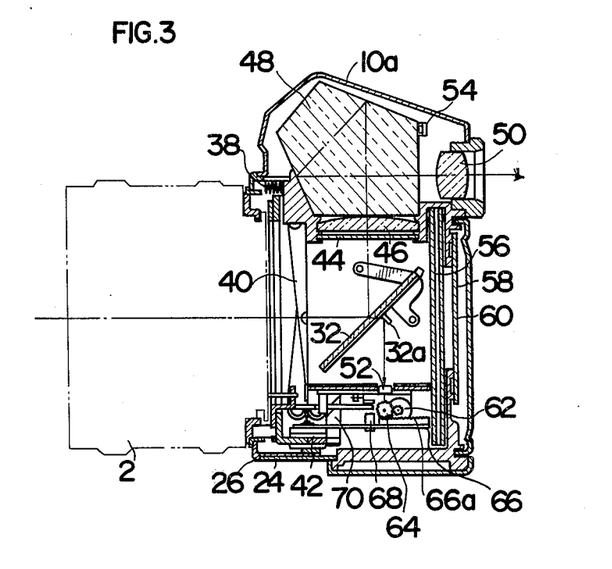
FIG. 3 is a vertical axial longitudinal sectional view of the camera shown in FIG. 1.
Figure 4:
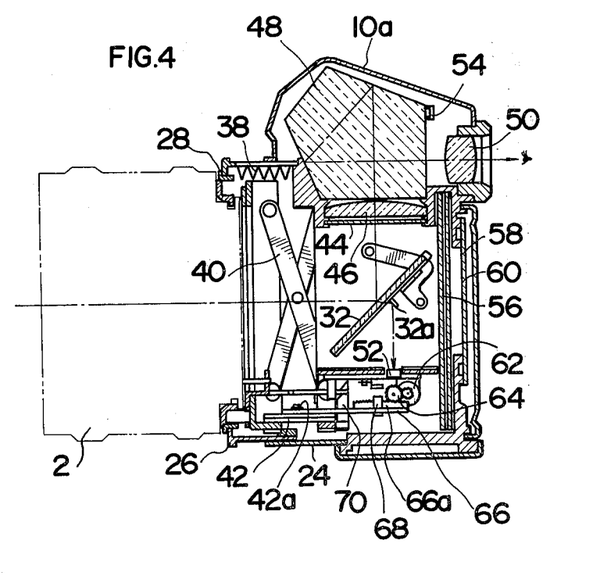
FIG. 4 is a vertical axial longitudinal sectional view of the camera shown in FIG. 2.

With reference to FIGS. 3 and 4 which show the lens mount 26 in its fully retracted and advanced positions respectively, a light transmitting portion is formed in the center of movable mirror 32, on the rear of which is mounted an auxiliary mirror 32a for rotation therewith. With this construction, scene light passing through objective lens 2 is reflected on movable mirror 32 and is directed toward a viewfinder optical system comprising focussing screen 44, condenser lens 46, pentaprism 48 and eyepiece 50. Part of the scene light is transmitted through the center of movable mirror 32 and is reflected by auxiliary mirror 32a, and is directed toward a light receiving element 52 arranged at a position optically equivalent to the film surface for the detection of the focus condition. A light sensing or responsive element 54 for automatic exposure control is arranged at the upper rear face of pentaprism 48. Also shown in the drawings are shutter mechanism 56, film 58 and film pressure plate 60. The focus condition of objective lens 2 is detected by light responsive element 52 for the detection of focussing and is indicated within a viewfinder. As shown in FIG. 7, the output signal of light responsive element 52 is transmitted as an input to a focus detecting circuit 53, which detects an in-focus or out-of-focus condition which is displayed by LEDs 55,57 and 59 provided inside the viewfinder. When, in the case of the present embodiment, objective lens 2 is focussed closer than an object to be photographed, LED 55 is energized when the lens is focussed at a greater distance than the object, LED 59 is energized and when the object is in proper focus, LED 57 is energized.

A motor 62 is selectively rotated in forward and reverse directions when changeover switch 30 is correspondingly manually operated. Motor 62 which is mounted in the camera body is connected through a pinion and gear 64 to a rack portion 66a, a slide or drive arm or lever 66. Slide arm 66 is restricted to only longitudinal movement parallel to the optical axis by a guide pin 68 carried by mirror box 34 and a guide shaft 70 slidably engaging an elongated longitudinal slot in side arm 66, as hereinafter described. Formed at the rear of side arm 66 is rack portion 66a, and the front end of side arm 66 is connected to the central connecting pivot 42a of link assembly 42. With the above construction, motor 62 is rotated to advance or retract slide arm 66 along the optical axis, whereby link assemblies 42, 40 and 41 are respectively expanded or contracted, so that lens mount 26 is correspondingly shifted along the optical axis under the guidance of the link assemblies.

Figure 5:
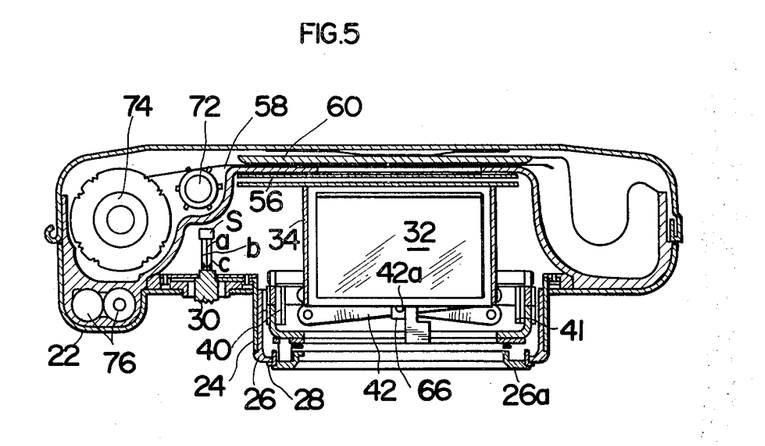
FIG. 5 is a horizontal cross-sectional view of the camera shown in FIG. 1.
Figure 6:
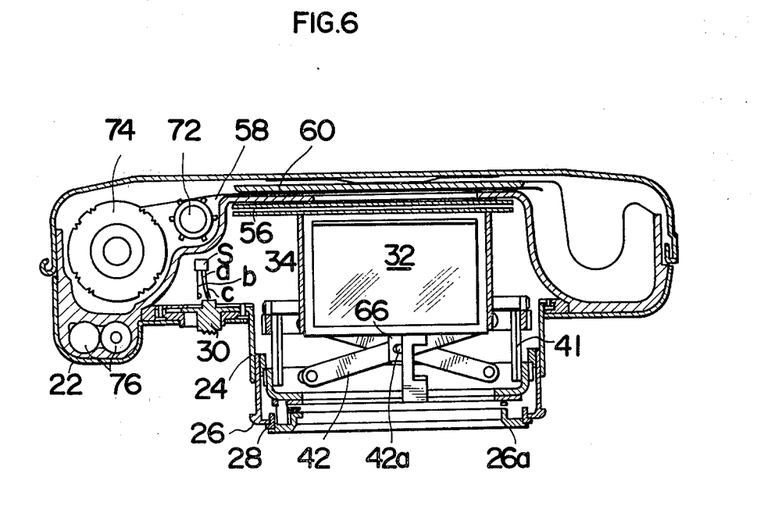
FIG. 6 is a horizontal cross-sectional view of the camera shown in FIG. 2.

As shown in FIGS. 5 and 6 which illustrate lens mount 26 in its fully retracted and advanced positions respectively, a sprocket 72, a spool 74 and a cell 76 are housed in and proximate grip 22. Cell 76 is a power supply source for motor 62 to move lens mount 26. A switch S is electrically transferred by manually operated changeover switch member 30, and is provided with one movable contact piece a and two fixed contact pieces b and c. When index 30a of changeover switch 30 shown in FIGS. 1 and 2 is set to mark " ", contact pieces a and b of switch S are inter-engaged to deliver power from cell 76 to motor 62, which is thus driven to retract lens mount 26 along the optical axis to the condition shown in FIG. 5. On the other hand, when index 30a is set to mark "N", contact pieces a and c of switch S are inter-engaged, energizing motor 62 to rotate in the reverse direction, whereby lens mount 26 is shifted along the optical axis toward its forwardmost position.

As best seen in FIG. 7, a fixed mounting frame 78 is secured to mirror box 34 by four inwardly directed pins 78a through 78d, and is of open topped approximately U-shaped configuration with a lateral bottom cross arm and vertical laterally spaced side arms laterally offset from the pentaprism. Furthermore, provided between fixed frame 78 and mirror box 34 is guide pin 70, engaging and guiding slide arm 66. Guide pin 70 also serves as a fastener to secure fixed frame 78 to mirror box 34. The respective side and bottom arms of fixed frame 78 are connected with the ends of the individual link bars in X-shaped link assemblies 40, 41 and 42 which are all expandable and contractable in directions parallel to the optical axis. A movable vertical rectangular base plate 80 is provided with a central circular opening and is provided along its side and bottom edges with rearwardly directed flanges 80a, 80b and 80c, to which the other ends of the link bars in the link assemblies are connected, respectively. In other words, the other ends of the link bars or levers of link assembly 40 are rotatably connected to flange 80a, those of link assembly 41 to flange 80b and those of link assembly 42 to flange 80c, respectively. Furthermore, formed on flanges 80a, 80b and 80c are rearwardly projecting tabs 80d and 80e and a tab 80f (not shown), to which lens mount 26 is bonded or secured by screws. Fixed to central connection pivot 42a of link assembly 42 is the front end of slide arm 66 which is longitudinally slidable parallel to the optical axis. When motor 62 is energized and driven through control circuit 82 by the manual operation of changeover switch 30, slide arm 66 is longitudinally moved parallel to the optical axis, whereby link assembly 42 is longitudinally expanded or contracted parallel to the optical axis, and link assemblies 40 and 41 are also expanded or contracted in directions parallel to the optical axis.

Another flange member 26a is secured to four fastener pins 84a through 84d projecting forwardly from movable base plate 80.

Provided between flange member 26a and movable base plate 80 are transmission ring 28, sliding resistor element 86 described hereinafter, lens mount 26 and diaphragm preset ring 36. Transmission ring 28 is rotatably supported between flange member 26a and lens mount 26, and is biased counterclockwise by a spring 88. Interlocking lug 28a formed on transmission ring 38 press engages transmission lug 6a of objective lens 2, as shown in FIG. 1, whereby the angular position thereof is set. In addition, a sliding brush 28b is fixed to and projects rearwardly from ring 28, and is in slidable engagement with sliding resistor element 86 fixed to movable base plate 80. With the above construction, rotated angular the position of transmission ring 28 is set depending on the rotated angular position of the diaphragm ring of objective lens 2, and in response thereto, a positional relationship is set between sliding brush 28b and sliding resistor 86, whereby the present aperture value information of the objective lens is transmitted to an exposure control circuit (not shown) in the camera body in the form of a resistance responsive signal.

Diaphragm preset ring 36 includes four circumferentially spaced peripheral slots respectively slidably engaged by pins 84a through 84d. Accordingly, diaphragm preset ring 36 is rotatable for the length of the peripheral slots, and is biased in a clockwise direction by a spring 90. Formed on diaphragm preset ring 36 is a rearwardly offset radially inwardly projecting lug 36a positioned so that it is engaged by diaphragm preset pin 8 of objective lens 2, when objective lens 2 shown in FIG. 1 is mounted on lens mount 26. Furthermore, diaphragm preset ring 36 is provided with arm 36b supporting tab 36a and extending rearwardly parallel to the optical axis, and a longitudinal slot 36c is formed in arm 36b. Slidably engaging longitudinal slot 36c is a pin 92a provided at the end of a diaphragm preset lever 92, the movement of which is controlled by a well-known diaphragm preset mechanism (not shown) located inside camera body 10. The lengths of arm 36b and slot 36c of diaphragm preset ring 36 are set so that follower pin 92a of diaphragm preset lever 92 engages slot 36c within the overall range of longitudinal movement of lens mount 26. A stop lever 94 engages diaphragm preset lever 92, to prevent the rotation thereof and disengages lever 92 in response to the shutter release operation to release the diaphragm preset lever from its stop condition, thereby allowing it to be rotated. With the above construction, the diaphragm of an objective lens 5 is aperture presettable in the overall movable range of lens mount 26 by means of the diaphragm preset mechanism provided inside a camera body. Lens mount 26 is secured to tabs 80d, 80e and 80f of movable base plate 80.

Considering now the operation of the improved mechanism described above, with the objective lens 2 being mounted on lens mount 26 of camera body 10 and being focussed at infinity, the lens mount 26 is fully retracted along the optical axis as shown in FIGS. 1, 3 and 5. Under this condition, the objective lens is in focus when an object is located at infinity, and this condition is indicated in the viewfinder by the illumination of LED 57. Moreover, under the aforesaid condition, the objective lens is out of focus on an object at a close distance, and this is observed in the viewfinder with the illumination of LED 59. While looking through the viewfinder, a photographer sets index 30a of changeover switch 30 to mark "N". This energizes and drives motor 62 to expand or extend link assemblies 40, 41 and 42, whereby lens mount 26 with objective lens 2 mounted thereon is guided and advanced by the link assemblies along the optical axis. While observing the focus condition displayed inside the viewfinder, the photographer sets index 30a of changeover switch 30 to mark "." when objective lens 2 is focussed on a desired object, i.e., when LED 57 lights up. This stops motor 62 and any further movement of lens mount 26 whereby their stop and focussed condition is maintained.

When lens mount 26 is at a forward position and the focussing position of objective lens 2 is set at a greater distance than that of the desired object, LED 55 lights up inside the viewfinder, advising the photographer to retract lens mount 26 along the optical axis by setting index 30a of changeover switch 30 to mark " ". Thus, the focussing position of objective lens 2 is retracted toward the camera, and when it corresponds to the distance of the desired object, LED 57 momentarily illuminates to indicate the in-focus condition. At this time, the photographer sets index 30a of changeover switch 30 to mark "." to stop the movement of objective lens 2.

With shutter release button 16 then depressed, the diaphragm of objective lens 2 is stopped down to the preset diaphragm aperture value by means of a diaphragm preset mechanism, movable mirror 32 and auxiliary mirror 32a are retracted outside the photographic optical path, and thereafter shutter 56 is opened for the time set by shutter speed setting dial 14. With mark "A" on shutter speed setting dial 14 set to index 14a, diaphragm aperture information on objective lens 2 set by sliding resistor 86 and ring 28, film speed information set by film speed setting dial 18 and the light measurement information output at light responsive element 54 are transmitted as inputs to an automatic exposure control circuit, and the exposure time is controlled by the automatic exposure control circuit.

Thus, in accordance with the embodiment of the present invention described above, focusing of objective lens 2 may be performed without using focusing ring 4, and focus control changeover switch 30 is arranged near shutter release button 16, thus allowing focusing and shutter release operations to be accomplished with one hand. In addition, all mechanisms necessary for focusing can be assembled into a camera body, and no focusing interlocking mechanism between the camera body and objective lens is required, resulting in a simple, inexpensive construction. Moreover, according to the present embodiment, the flange back of a camera is changeable by shifting lens mount 26 forward, whereby the closest photographic distance of an objective lens is further shortened by setting the shift of lens mount 26 to an appropriate length to make close-up photography without the use of an extension bellows or close-up ring. In addition, link assemblies 40, 41 and 42 are simple and compact in construction, yet strong enough to withstand high external forces, thereby assuring the movement and positioning of objective lens 2 along and coaxial with the optical axis. At the same time, the link assemblies require a minimum of applied force for their expansion and contraction and are capable of guidance over great lengths thereby minimizing the required output of the drive device such as a motor, whereby shifting over a longer length is efficiently achieved.

It should be understood that while the mechanism of the present embodiment is constructed such that the drive device is driven in response to a manual operation to control the movement of the objective lens, the present invention is not limited thereto, and the drive device may be automatically controlled by a focus detection device. In this latter case, there are numerous known methods and devices available for focus detection. These include a method utilizing the space frequency of an image formed by an objective lens, that utilizing contrasts, that utilizing a split image, that utilizing the phase difference between the outputs of two light receiving elements disposed symmetrically to the optical axis behind the plane optically equivalent to the film plane by scanning such planes vertically to the optical axis using a grid or the like.

When, moreover, a focus detection method detects a direction in which an objective lens may be moved for focusing a desired object, the rotation direction and speed of motor 62 are controllable based on the output of the focus detection device. With the above construction, changeover switch 30 may be connected and employed as the main switch of the focusing mechanism. Furthermore, when the main switch is constructed and associated such that it is closed upon depression of shutter release button 16, focusing and photography are initiated by shutter release button 16, thereby requiring that shutter release button 16 only be depressed by a photographer.

In addition, with the present embodiment, lens mount 26 is shifted forwardly and rearwardly along the optical axis in response to the forward and reverse rotations of motor 62. However, the improved mechanism may be so construed that link assemblies 40, 41 and 42 are biased toward their contracted conditions by springs, against whose influence lens mount 26 is shifted forward by the drive device, such as a motor, and lens mount 26 is retracted to its fully retracted position under the action of the springs after its disconnection from the drive devices.

Figure 8:
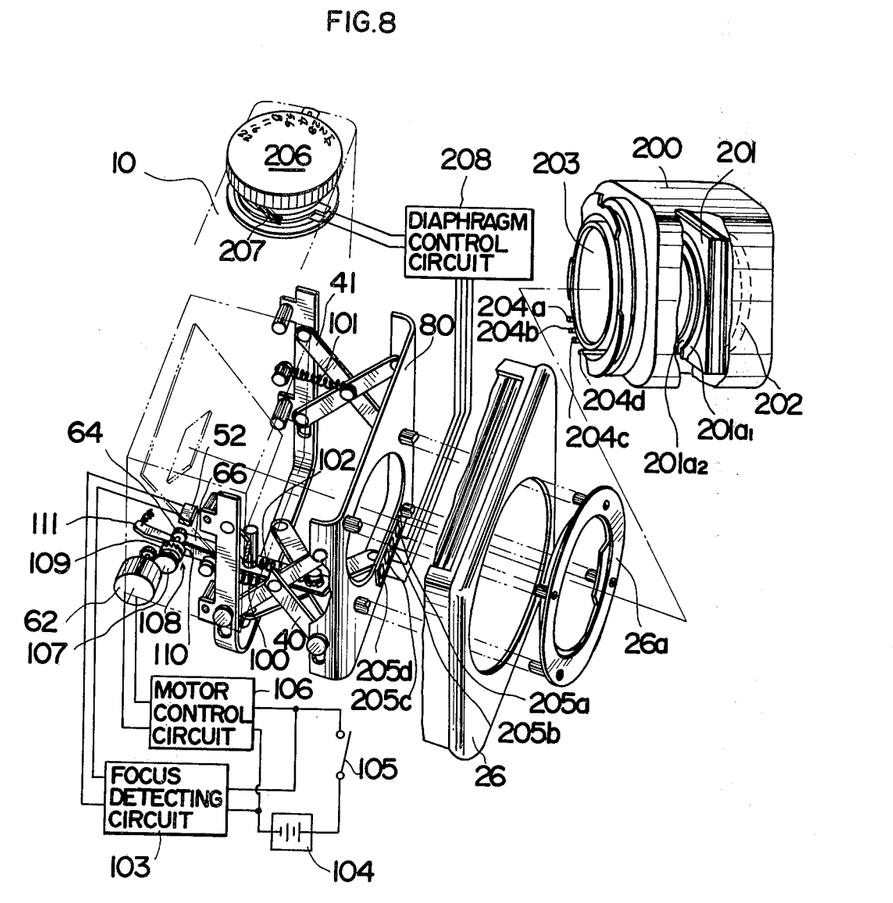
FIG. 8 is an exploded perspective and diagrammatic view illustrating only the essential parts of another embodiment of the present invention.

FIG. 8 illustrates another embodiment of the present invention, in which the above construction is achieved. The same reference numbers are used for members corresponding to those in the first embodiments in order to simplify the description. Springs 100, 101 and 102 are provided between the camera body and the respective pivoted intersecting point of paired link bars constituting each of the link assemblies 40, 41 and 42. These link assemblies are biased by springs 100, 101 and 102 in the direction of their contraction. In the present embodiment, an automatic focusing mechanism is provided for automatically focusing objective lens 200. The automatic focusing mechanism includes light receiving element 52, focus detection circuit 103, power supply source 104, start switch 105, motor control circuit 106 and motor 62 connected as illustrated. Motor control circuit 106 supplies power to rotate motor 62 when start switch 105 is manually closed externally of the camera, and cuts off power when receiving an in-focus signal from focus detection circuit 103 to thereby stop motor 62. On the other hand, focus detection circuit 103 receives a signal from light receiving element 52 to detect an in-focus or out-of-focus condition of objective lens 200, and sends an in-focus signal to motor control circuit 106 when objective lens 200 is focused on a desired object. Drive gear 107 drive coupled to motor 62 is connected through a one-way clutch mechanism 108 to gear 64. Clutch mechanism 108 includes a first clutch gear or member 109 connected to drive gear 107 and second clutch gear or member 110 connected to gear 64, second clutch gear 110 being axially movable together with gear 64 and biased by a spring (not shown) into engagement with first clutch gear 109. Clutch mechanism 108 is constructed such that it transmits only the one-way rotation of drive gear 107, i.e., only the counterclockwise rotation of drive gear 107 under the present embodiment, to gear 64. A clutch control lever 111 is rotated counterclockwise by an exposure completion signal, e.g., a signal responsive to the completion of travel of the trailing shutter curtain in the case of focal-plane shutter camera, and is reset to the position shown in FIG. 8 in response to the film advance operation.

With the above construction, focusing is enabled by the external manual closing of start switch 105 first to be closed manually and when start switch 105 is closed, drive motor 62 is energized and rotates drive gear 107 counterclockwise, which rotation is transmitted through clutch mechanism to gear 64, causing rack carrying slide arm 66 engaged therewith to be shifted along the optical axis. As slide arm 66 is shifted forwardly, link assemblies 40, 41 and 42 are expanded, causing lens mount 26 to be linearly shifted along the optical axis at a fixed vertical orientation. On the other hand, focus detection circuit 103 detects the in-focus or out-of-focus condition by a signal from light receiving element 52 during the shift of objective lens 200, and generates an in-focus signal when objective lens is focussed on a desired object. With the input of an in-focus signal, motor control circuit 106 interrupts the supply of power to drive motor 62, which, in turn, stops. Upon the shutter being released when the infocus condition is reached, the film is exposed in the well-known manner, and after exposure with a lapse of a predetermined period of time, clutch control lever 111 is swung counterclockwise by a mechanism (not shown). With clutch control lever 111 swung counterclockwise, gear 64 is retracted to a position out of engagement with rack portion 66a of slide arm 66. In addition, second clutch gear 110 formed integrally with gear 64 is moved to a position where it is disengaged from first clutch gear 109. With these clutches thus disengaged, the link assemblies are immediately contracted under the action of springs 100, 101 and 102, respectively, and lens mount 26 is rapidly shifted to its fully retracted position along the optical axis. With the film advance operation, clutch control lever 111 is rotated clockwise to reset gear 64 and second clutch gear 110 to the positions shown in FIG. 8 in readiness for focusing in the above manner.

It is to be noted that a camera in accordance with the last described embodiment uses an objective lens 200 equipped with an electrical diaphragm mechanism unlike the camera according to the first embodiment. That is, objective lens 200 is provided with a common transparent electrode and ring-shaped transparent electrodes $201a_1$, $201a_2$ ... $201an$, each different in diameter and being concentrically arranged to overlap each other. Liquid crystal plate 201 is disposed between lenses 202 and 203, and pins 204a, 204b, 204c and 204d electrically connected to these transparent electrodes, respectively, projected rearwardly from the rear edge of the lenses. On the other hand, movable base plate 80 is provided with contact pieces 205a, 205b, 205c and 205d which engage respective pins 204a, 204b 204c and 204d when objective lens 200 is mounted on lens mount 26.

A diaphragm setting dial 206 is rotatably mounted on camera body 10, and the brush 207 of a slide resistor is connected thereto. A diaphragm control circuit 208 is arranged to actuate a corresponding number of contact pieces 205a through 205d in response to the adjusted resistance value of the slide resistor. Moreover, the diaphragm control circuit receives an exposure termination signal and a shutter release signal, thereby actuating the preceding contact pieces only when receiving a shutter release signal, and, in contrast, deactuating the contact pieces when receiving an exposure termination signal.

Consequently, when the shutter is released with objective lens 200 mounted on lens mount 26, a selected plurality of the specified contact pieces 205a through 205d are turned on in response to preset position of diaphragm setting dial 206. When an electrical signal applied to the contact pieces is transmitted as an input to objective lens 200 through signal pins 204a through 204d, the common electrode and the specified ring-shaped electrodes are energized, whereby the transparent electrodes form opaque rings. As a voltage is sequentially applied to the selected successive ring-shaped electrodes $201a_1$ through $201an$, the round transparent portion in the center of liquid crystal plate 201 gradually decreases in diameter. This is equivalent to the diaphragm being stopped down.

As described above, the camera of the present invention is constructed such that a lens mount on which an exchangeable objective lens is mounted is supported by expandable and contractable link assemblies on a camera body for shifting along the camera optical axis and the link assemblies are expanded and contracted by drive means provided inside the camera body, whereby the entire mount coupled objective lens is moved for focusing. Consequently, all the component parts required for the focusing mechanisms are assembled in the camera body, and as a result, it is possible to eliminate any special interlocking mechanism which interlocks the camera body and an exchangeable objective lens for focusing, thereby achieving a simple and inexpensive construction. In addition, as the objective lens need only be mounted on the lens mount, conventional interchangeable objective lenses may be employed, including objective lenses equipped with no focusing mechanism. Furthermore, the flange back of a camera is changeable by expanding the lens mount, and thus close-up photography is possible without using any special attachment for close-up photography, such as bellows or a close-up ring. Furthermore, with the mechanism of the present invention, link assemblies are provided to guarantee that the objective lens shifts along and is maintained coaxial with the optical axis. The link assemblies are simple and compact in construction and sufficiently withstand external forces so that the lens mount ensures the accurate shift of the objective lens parallel to the optical axis. In addition, the link assemblies require a minimum of applied force for expansion and contraction and are capable of guidance over a long distance so that great freedom of drive means and other mechanism design is available.

Moreover, when a drive means is arranged for manual control, manual focusing is possible without turning a focusing ring. With the drive means automatically controlled in response to the output of a focus detection device, the earlier focusing operations are unnecessary.

When a diaphragm control mechanism provided inside a camera body is arranged to control the diaphragm of an objective lens within the overall shift range of the lens mount, the diaphragm of the objective lens is controllable based on the information supplied from the camera, although the objective lens is shifted by the drive means to any desired position.

In addition, when the link assemblies are disposed on the three sides other than that of the pentaprism side, the link assemblies are more durable under external forces so that the construction and positioning of the pentaprism and other camera components are not restricted.

While there have been described and illustrated preferred embodiments of the present invention, it is apparent that numerous alterations, additions and omissions may be made without departing from the spirit thereof.

What is claimed is:

1. A single lens reflex camera including a body member and housed in the upper part of said body member, a pentaprism having a downwardly facing bottom face, comprising a lens mount disposed forwardly of said body member, an objective lens separably coupled to said lens mount coaxially with the optical axis of said body member, a pair of laterally spaced extendable contractable extension members extending between said lens mount and body member and supporting said lens mount for longitudinal linear advance and retraction along said optical axis at a fixed orientation of said lens mount, an extendable contractable light tight conduit extending between said body member and lens mount and means located in said body member and coupled to said lens mount for shifting said lens mount along said optical axis.

2. The camera of claim 1 wherein each of said extension members comprises a pair of links swingably pivoted to each other between their respective ends and swingably connected at their inner and other ends to said body member and lens mount respectively.

3. The camera of claim 2 wherein the inner ends of said links of each pair are swingably connected at a fixed point and a vertically movable point respectively on said body member and the opposite outer ends of said links are swingably connected at a vertically movable point and a fixed point respectively on said lens mounts.

4. The camera of claim 3 wherein said link pairs lie in parallel vertical longitudinal planes and including a third contractable extendable pair of swingably connected links lying in a longitudinal horizontal plane below said vertical link pairs and extending between said body member and lens mount.

5. The camera of claim 3 comprising an open topped, laterally extending vertical U-shaped bracket mounted on said body member below said pentaprism and including a bottom cross arm and vertical side arms, the inner ends of said links being connected to said bracket side arms.

6. The camera of claim 3 wherein said conduit comprises a pair of slidably telescoping open topped peripheral walls of substantially U-shaped transverse cross section extending between said body member and lens mount, and a longitudinally contractable extendable accordian wall extending rearwardly from the upper edge of said lens mount to said body member and sealing the upper part of said conduit against light entry.

7. The camera of claim 6 wherein said link pairs are disposed within said conduit.

8. The camera of claim 1 wherein said lens mount shifting means comprises an electric motor located in said body member and means including rotational translational motion translation means coupling said motor to said lens mounts.

9. The camera of claim 8 wherein said motion translation means comprises: a third extendable contractable extension member extending between said lens mount and body member; a slide arm, one end of which is connected to said third extendable contractable extension member, said slide arm extending rearwardly from said extendable contractable extension member and provided with a rack; and a gear driven by said motor and engaging said rack.

10. The camera of claim 8 comprising means including an externally manually operable switch for selectively energizing said motor to rotate in a forward or reverse direction to respectively advance and retract said lens mount.

11. The camera of claim 8 comprising spring means urging said lens mount to a longitudinally retracted position, manually operable means for energizing said motor to advance said lens mount and means for uncoupling said motor from said lens mount to permit the retraction of said lens mount under the influence of said spring.

12. The camera of claim 8 comprising manually operable means for energizing said motor to longitudinally shift said lens mount means for detecting the focus condition of said objective lens on an object and means responsive to said detecting means for de-energizing said motor when said object is in focus.

13. The camera of claim 8 including means for providing a visual signal indicating the condition of focus of said objective lens on a selected object.

14. A focusing device for an exchangeable lens camera which includes a body provided with a finder optical system and a mirror diagonally located within a photographic optical path for reflecting object light upwardly to said finder optical system, comprising:
a lens support member on which an exchangeable lens is mounted;
first and second similar, linearly longitudinally extendable contractable link assemblies extending between and connected to said lens support member and the camera body, said first link assembly lying in a first plane positioned below said mirror and said second link assembly lying in a second plane normal to said first plane;

an extendable and contractable shielding means extending between and secured to said lens support member and the camera body for establishing a light tight chamber between said lens support member and the camera body;
an externally manually operable switch means;
an electric motor actuated in response to the closure of said switch means; and
drive means connected to said electric motor for moving said lens support member.

15. A focusing device as set forth in claim 14, further comprising a third linearly longitudinally extendable contractable link assembly extending between and connected to said lens support member and the camera body, said third link assembly lying in a plane parallel to said second plane.

16. A focusing device as set forth in claim 14, wherein said operable switch means is transferable between alternate respective positions for intercepting the current to said motor, for energizing said motor to rotate in a predetermined direction and for energizing said motor to rotate in a reversed direction.

17. A focusing device as set forth in claim 16, further comprising a light receiving element disposed in a plane optically equivalent to the camera focal plane, a focus detecting circuit for detecting the focus condition of an image projected onto said light receiving element and means for indicating said focus condition in accordance with an output signal from said focus detecting circuit.

18. A focusing device as set forth in claim 14, further comprising a light receiving element provided in a plane optically equivalent to the camera focal plane, a focus detecting circuit for detecting a focus condition and providing a predetermined output signal when an image projected onto said light receiving element is in focus, and a motor control circuit for actuating said motor in response to the closure of said operable switch means and deactuating said motor in response to said predetermined output signal.

19. A focusing device as set forth in claim 18, wherein said drive means includes a clutch mechanism having a first condition drive coupling said motor to said link assemblies and a second condition drive uncoupling said motor from said link assemblies, and further comprising means for urging said link assemblies to one extreme position thereof within the focus of the movement of said link assemblies and a control member for displacing said clutch mechanism from its first to second condition in response to the completion of the exposure by the camera.

20. A focusing device as set forth in claim 14, wherein said exchangeable lens to be mounted on said lens support member includes a diaphragm mechanism and a movable member connected to the diaphragm mechanism and wherein said exchangeable lens camera includes diaphragm control means for stopping down the diaphragm mechanism in said exchangeable lens through said movable member and further comprising extendable contractable interlocking means for interlocking said control means and said movable member, said interlocking means being movable integrally with said lens support member.

* * * * *